Patented Dec. 15, 1953

2,662,910

UNITED STATES PATENT OFFICE 2,662,910

KETOSILOXANES

Leo H. Sommer, State College, Pa., assignor to Dow Corning Corporation, Midland, Mich., a corporation of Michigan No Drawing. Application December 13, 1951, Serial No. 261,597

8 Claims. (Cl. 260—448.2)

This invention relates to siloxanes having a carbonyl group in the molecule.

It is an object of this invention to prepare new polymeric siloxanes which have functional groups in the polymer chains.

In this application Me designates the methyl radical.

This invention relates to polysiloxanes in which the polymer units are of the formula

[Me$_2$Si(CH$_2$)$_n$CO(CH$_2$)$_n$SiMe$_2$O]

where $n$ has a value from 2 to 5 inclusive.

The above polymers are prepared by cleaving ketones of the formula [R'Me$_2$Si(CH$_2$)$_n$]$_2$CO where R' is a methyl or phenyl radical and $n$ is as above defined, with sulphuric acid followed by hydrolysis of the sulphate with water. The reactions involved are cleavage of the R' group from the silicon by the sulphuric acid to give a silyl sulphate and methane or benzene depending upon whether the R' group is methyl or phenyl, respectively. The sulphate group is then removed from the silicon by hydrolysis whereupon a silanol is formed which condenses to a polysiloxane.

The above described siloxanes may be either homopolymeric or copolymeric in nature. Homopolymers (i. e. those in which all units are the same) are obtained by treating a single ketosiloxane with sulphuric acid and thereafter hydrolyzing the product. Copolymers may be obtained by treating a mixture of 2 or more of the above defined ketones with sulphuric acid followed by hydrolysis. For example, one may prepare a copolymer by treating a mixture of one of the above ketones in which $n$ is 2 and one in which $n$ is 4. The resulting copolymers will then be composed of both types of units.

In addition, copolymers may be prepared by interacting the ketosiloxanes of this invention with conventional siloxanes of the formula

where R is any monovalent hydrocarbon radical free of aliphatic unsaturated, and $x$ has a value from 1 to 3, inclusive. These copolymers are obtained by interacting one or more of the above ketosiloxanes with one or more of the defined conventional siloxanes. This interaction may best be carried out in the presence of catalysts such as acids, salts and alkalies. Preferably, the catalyst employed is acidic in nature since alkaline materials tend to cause undesirable side reactions of the carbonyl group.

Conventional siloxanes which may be copolymerized with those of this invention may be either monoorganosiloxanes such as phenylsilicic acid, phenylsilsesquioxane, methylsilsesquioxane and butylsilicic acid; or diorganosiloxanes such as dimethylsiloxane, phenylmethylsiloxane, ditolylsiloxane, stearylmethylsiloxane, and naphthylmethylsiloxane; or triorganosiloxanes such as hexamethyldisiloxane, hexaphenyldisiloxane, and tetraamyldiphenyldisiloxane.

In order for the ketosiloxanes of this invention to have any appreciable effect on the copolymers, they should be present in amount of at least .001 mol per cent.

The ketosiloxanes of this invention exhibit other standard behavior common to conventional siloxanes. For example, they may be depolymerized by heating at temperatures above 350° C. under reduced pressure. Under such conditions, cyclic polymers are obtained. The rearrangement may be carried out at lower temperatures such as 250° C. if acidic catalysts are employed.

The ketosilanes of the formula

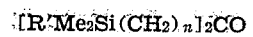

which are employed as starting materials in this invention are described and claimed in the applicant's copending application Serial Number 261,602 entitled "Bis-Trioganosilyl-Substituted Ketones," filed concurrently herewith. In brief, these ketones may be prepared by condensing esters of the formula R'Me$_2$Si(CH$_2$)$_n$COOEt with diisopropylammonium magnesium bromide followed by decarboxylation of the resulting beta-ketoester with acids such as HCl, or H$_2$SO$_4$.

The materials of this invention are useful as additives for conventional siloxanes. They are also useful as intermediates in the preparation of resinous materials in which cross-linking is brought about through the carbonyl group.

The following examples are illustrative only and are not to be construed as limiting the invention which is properly set forth in the appended claims.

Example 1

55.8 grams of 2,2,8,8-tetramethyl-2,8-disila-5-nonaneone, [Me$_3$Si(CH$_2$)$_2$]$_2$CO, was treated with 200 grams of concentrated sulfuric acid. The ketone was added slowly to the acid and the reaction mixture was cooled with water. There was a vigorous evolution of gas. When the evolution had ceased the mixture was slowly poured onto cracked ice. The resulting organic material was extracted with ether. The combined extracts were dried and the ether removed.

The resulting product was distilled at atmospheric pressure in a stream of nitrogen leaving a residue of a highly viscous polymeric material in which the unit formula was

[Me₂Si(CH₂)₂CO(CH₂)₂SiMe₂O]

The distillate was redistilled at reduced pressure and there was obtained on oily material boiling from 58° C. at 52 mm. to 153° C. at 6 mm. This material was a mixture of polymers in which the repeating unit was

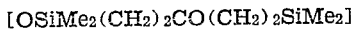
[OSiMe₂(CH₂)₂CO(CH₂)₂SiMe₂]

These mixed polymers reacted with 2,4-dinitrophenylhydrazine to give oily and amorphous products.

*Example 2*

Employing the method shown in Example 1, 138 grams of 2,2,8,8-tetramethyl-2,8-disila-5-nonaneone was added over a period of 2½ hours to 475 grams of concentrated sulfuric acid. After hydrolysis and washing 134 grams of a viscous polymeric ketosiloxane remained.

This polymeric ketone was rearranged by heating at 370° to 385° C. under a pressure of 3 to 5 mm. There was obtained 112.5 grams of distillate which consisted of both a solid and a liquid phase. The solid was filtered and recrystallized from 95 per cent ethyl alcohol whereupon 30.1 grams of a white crystalline solid melting point 129 to 130° C. was obtained. This material was found to have molecular weight of 425 and to contain 26.7 per cent silicon. This shows that the material was a cyclic dimer of the formula [Me₂Si(CH₂)₂CO(CH₂)₂SiMe₂O]₂.

The liquid portion of the distillate amounted to 66 grams and had a refractive index of 1.4575 at 20° C. This material was a mixture of higher cyclics of the polymeric ketone.

*Example 3*

58.5 grams of the liquid polymer fraction obtained in Example 2 was mixed with 487 grams of hexamethyldisiloxane and 35 ml. of the concentrated sulfuric acid. The mixture was stirred at room temperature for four hours. At the end of this time, 100 ml. of water was added and the mixture was stirred for 10 minutes. The organic layer was washed twice with water and then dried over anhydrous K₂CO₃. The excess hexamethyldisiloxane was distilled at atmospheric pressure and the residue was then fractionated. The first product obtained boiled at 95° C. at 2 mm. pressure and had a refractive index of 1.4262 at 20° C. This material was the polymer

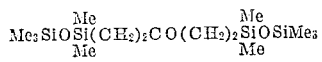
Me₃SiOSi(CH₂)₂CO(CH₂)₂SiOSiMe₃ (with Me groups)

The compound was reacted with 2,4-dinitrophenylhydrazine and there was obtained a solid derivative which, after recrystallization from an alcohol-chloroform mixture melted at 245 to 247° C.

The residue from the distillate was a liquid which was composed of higher copolymers having the formula

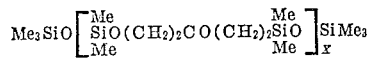
Me₃SiO[SiMe(CH₂)₂CO(CH₂)₂SiMe]ₓSiMe₃ where $x$ is greater than 1.

*Example 4*

When the ketones shown below are treated with concentrated sulfuric acid and the resulting product thereafter hydrolyzed as shown in Example 1, siloxane polymers in which the polymer units are those shown below, are obtained. In each case, the polymers are viscous materials which are mixtures of molecules of varying molecular weight.

| Ketone | Unit formula of polymer produced |
|---|---|
| [Me₂Si(CH₂)₃]₂CO | [Me₂Si(CH₂)₃CO(CH₂)₃SiMe₂O]. |
| [Me₂Si(CH₂)₄]₂CO | [Me₂Si(CH₂)₄CO(CH₂)₄SiMe₂O]. |
| [C₆H₅Me₂Si(CH₂)₅]₂CO | [Me₂Si(CH₂)₅CO(CH₂)₅SiMe₂O]. |

*Example 5*

When .1 gram mol of a siloxane having the unit formula [Me₂Si(CH₂)₃CO(CH₂)₃SiMe₂O] is copolymerized with 0.9 gram mol of phenylmethylsiloxane by the method shown in Example 3, a liquid copolymer composed of 10 mol per cent of the former siloxane units and 90 mol per cent of the latter siloxane units is obtained.

*Example 6*

When .1 gram mol of a siloxane having the unit formula [Me₂Si(CH₂)₄CO(CH₂)₄SiMe₂O], .1 gram mol of the siloxane having the unit formula [Me₂Si(CH₂)₅CO(CH₂)₅SiMe₂O], .3 gram mol of phenylsilicic acid, .3 gram mol of methylsilicic acid, and .2 gram mol of stearylmethylsiloxane are copolymerized in accordance with the method shown in Example 3, a resinous copolymeric siloxane containing each of the above defined units is obtained.

That which is claimed is:

1. A polysiloxane in which all of the polymer units are of the formula

—Me₂Si(CH₂)ₙCO(CH₂)ₙSiMe₂O— in which $n$ has a value from 2 to 5 inclusive.
2. A siloxane of claim 1 where $n$ is 2.
3. A siloxane of claim 1 where $n$ is 3.
4. A siloxane of claim 1 where $n$ is 4.
5. A siloxane of claim 1 where $n$ is 5.
6. [Me₂Si(CH₂)₂CO(CH₂)₂SiMe₂O]₂.

7. Me₃SiOSi(Me)₂(CH₂)₂CO(CH₂)₂Si(Me)₂OSiMe₃

8. A polysiloxane consisting essentially of

—Me₂Si(CH₂)ₙCO(CH₂)ₙSiMe₂O— polymer units where $n$ has a value of 2 to 5 inclusive and up to .999 mol per cent polymer units having the general formula

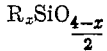
$$R_xSiO_{\frac{4-x}{2}}$$

where R is a monovalent hydrocarbon free of aliphatic unsaturation and $x$ has a value of from 1 to 3 inclusive.

LEO H. SOMMER.

References Cited in the file of this patent

Sommer et al.: Journ. Amer. Chem. Soc., vol. 73, 1951, page 882.